United States Patent
Onufrak

(10) Patent No.: US 12,311,710 B1
(45) Date of Patent: May 27, 2025

(54) EASY CONNECT TRAILER HITCH LOCK

(71) Applicant: Chad Onufrak, Kimball, MI (US)

(72) Inventor: Chad Onufrak, Kimball, MI (US)

( * ) Notice: Subject to any disclaimer, the term of this patent is extended or adjusted under 35 U.S.C. 154(b) by 474 days.

(21) Appl. No.: 17/891,175

(22) Filed: Aug. 19, 2022

Related U.S. Application Data

(63) Continuation-in-part of application No. 17/884,004, filed on Aug. 9, 2022.

(60) Provisional application No. 63/246,148, filed on Sep. 20, 2021, provisional application No. 63/243,409, filed on Sep. 13, 2021.

(51) Int. Cl.
*B60D 1/28* (2006.01)
*B60D 1/06* (2006.01)

(52) U.S. Cl.
CPC ............... *B60D 1/28* (2013.01); *B60D 1/06* (2013.01)

(58) Field of Classification Search
CPC ................................ B60D 1/28; B60D 1/60
See application file for complete search history.

(56) References Cited

U.S. PATENT DOCUMENTS

| | | | | |
|---|---|---|---|---|
| 3,884,055 A * | 5/1975 | Vuillemot | ............... | B60D 1/60 280/507 |
| 4,131,295 A | 12/1978 | Highberger | | |
| 5,000,067 A * | 3/1991 | Kolbusz | ............... | B25B 13/485 81/436 |
| 5,988,667 A * | 11/1999 | Young | ................... | B60D 1/241 280/506 |
| 6,193,260 B1 | 2/2001 | Homan et al. | | |
| 6,619,687 B2 | 9/2003 | Goby | | |
| 6,666,051 B1 * | 12/2003 | Li | .......................... | B60R 25/001 70/38 A |
| 6,773,200 B2 * | 8/2004 | Cole | ........................ | B60R 9/06 403/376 |
| 7,121,121 B2 * | 10/2006 | Wyers | ..................... | B60D 1/60 70/38 A |
| 7,448,823 B2 | 11/2008 | Silva | | |
| 8,083,194 B2 | 12/2011 | Sandusky et al. | | |
| 8,393,631 B1 | 3/2013 | Sybert et al. | | |
| 9,242,519 B2 | 1/2016 | Terpsma et al. | | |
| 10,155,423 B1 * | 12/2018 | Gebheim | ................. | B60D 1/52 |
| 10,953,712 B2 | 3/2021 | Weigert et al. | | |
| 2001/0054807 A1 | 12/2001 | Homan et al. | | |
| 2004/0195802 A1 | 10/2004 | Allen et al. | | |
| 2005/0146117 A1 | 7/2005 | Van Den Bosch et al. | | |
| 2005/0225054 A1 * | 10/2005 | Budge | ..................... | B60D 1/06 280/507 |

(Continued)

*Primary Examiner* — Kevin Hurley
(74) *Attorney, Agent, or Firm* — Maiorana Patent Law, PA

(57) ABSTRACT

An apparatus comprising a first arm, a second arm and a locking mechanism. The first arm may comprise a first opening. The second arm may comprise a second opening. The first arm may be attached to the locking mechanism. The second arm may be removably attached to the locking mechanism. The first arm and the second arm may be formed to fit around a receiver tube for a trailer hitch. The first opening may be configured to fit over a first locking pin that extends through a first side of the receiver tube. The second opening may be configured to fit over a second locking pin that extends through a second side of the receiver tube. The locking mechanism may be configured to secure the arms over the first locking pins to prevent a connector for a trailer coupler from disconnecting from the receiver tube.

19 Claims, 7 Drawing Sheets

(56) References Cited

U.S. PATENT DOCUMENTS

| | | | |
|---|---|---|---|
| 2015/0123379 A1* | 5/2015 | Yuan | B60D 1/06 |
| | | | 280/507 |
| 2017/0008358 A1 | 1/2017 | Pulliam et al. | |
| 2018/0272817 A1 | 9/2018 | Colbaugh et al. | |
| 2020/0361260 A1 | 11/2020 | Weigert et al. | |

* cited by examiner

EASY CONNECT TRAILER HITCH LOCK

This application relates to U.S. application Ser. No. 17/884,004, filed on Aug. 9, 2022. U.S. application Ser. No. 17/884,004 relates to U.S. Provisional Application No. 63/243,409, filed on Sep. 13, 2021 and also relates to U.S. Provisional Application No. 63/246,148, filed on Sep. 20, 2021. Each of the mentioned applications are hereby incorporated by reference in its entirety.

FIELD OF THE INVENTION

The invention relates to vehicle connectors generally and, more particularly, to a method and/or apparatus for implementing an easy connect trailer hitch lock.

BACKGROUND

Trailer hitches allow vehicles to tow various types of other vehicles or objects (i.e., disabled vehicles, recreational vehicles such as boats and campers, storage containers, etc.). Conventional trailer hitches are inserted into a hitch receiver mounted on the towing vehicle. A pin is inserted through the hitch receiver after the trailer hitch is inserted. The pin secures the trailer hitch to the hitch receiver. After the pin is inserted, a clip is then attached to the pin for additional security. The clip is used to ensure that the pin does not fall out (i.e., due to vibrational forces while the towing vehicle is moving). The conventional pin and clip system is effective, but adds additional parts for a user to keep track of. Trailer hitches are often used for vacations when families are keeping track of a lot of travel items. The pin and clip can be lost.

The pin and clip are also incompatible with alternative tools for securing a trailer hitch. Even alternative tools for securing a trailer hitch can either become accidentally unlocked, or can be intentionally tampered with. For example, a trailer hitch that is easy to connect and disconnect can also make disconnecting a towing vehicle from a trailer easier for a thief in order to steal either the towing vehicle, the trailer or both. A tool used for providing a secure physical connection between a towing vehicle and a trailer should also be capable of being locked.

It would be desirable to implement an easy connect trailer hitch lock.

SUMMARY

The invention concerns an apparatus comprising a first arm, a second arm and a locking mechanism. The first arm may comprise a first opening. The second arm may comprise a second opening. The first arm may be attached to the locking mechanism. The second arm may be removably attached to the locking mechanism. The first arm and the second arm may be formed to fit around a receiver tube for a trailer hitch. The first opening may be configured to fit over a first locking pin that extends through a first side of the receiver tube. The second opening may be configured to fit over a second locking pin that extends through a second side of the receiver tube. The locking mechanism may be configured to secure the first arm and the second arm over the first locking pin and the second locking pin to prevent a connector for a trailer coupler from disconnecting from the receiver tube.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing an easy connect trailer hitch lock that may (i) connect to a standard trailer hitch receiver, (ii) secure locking pins of a trailer hitch connection, (iii) fit under a bumper of a towing vehicle, (iv) provide rubber seals to prevent slipping and rotation, (v) be oriented above a trailer hitch receiver, (vi) be oriented below a trailer hitch receiver, (vii) provide a locking mechanism, (viii) angle a locking mechanism for easy access, (ix) prevent a disconnect of a trailer hitch connection due to tampering and/or accident, and/or (x) be easy to use.

Embodiments of the present invention may be configured to secure a trailer hitch connection. Locking pins may be implemented to provide a connection between a connector for a trailer coupler and a receiver tube of a trailer hitch on a towing vehicle. While the locking pins alone may provide a secure connection, embodiments of the present invention may be configured to ensure the locking pins do not accidentally release. Embodiments of the present invention may be configured to prevent intentional tampering (e.g., sabotage, theft, general mischief, etc.) with the connection between a trailer vehicle and a tow vehicle. Embodiments of the present invention may be configured to provide a cover for the locking pins.

Embodiments of the present invention may be configured to fit over and/or partially around a trailer hitch receiver tube. By fitting over and/or partially around the trailer hitch receiver tube, locking pins that may extend from the receiver tube may be covered and/or protected. In some embodiments, a weather seal may be implemented. The weather seal may prevent rotation when attached to the receiver tube. The weather seal may further provide protection from the elements to the locking pins.

Embodiments of the present invention may comprise at least two portions. The two portions may be removably connected together. Implementing two portions may enable embodiments of the present invention to fit together over the locking pins. For example, the portions may be implemented using a generally inflexible material to form a rigid body around the receiver tube. Due to the inflexibility, the two portions may not be removed from the locking pins by bending and/or stretching. For example, the two portions may be connected and locked together to prevent removal from the receiver tube. Removal from the receiver tube may be implemented by unlocking the two portions from each other. For example, embodiments of the present invention may be attached to the receiver tube by placing each portion over a respective locking pin and joining the two portions together. Similarly, embodiments of the present invention may be removed from the receiver tube by unlocking the two portions and pulling each portion off of the locking pins.

Figure 1:
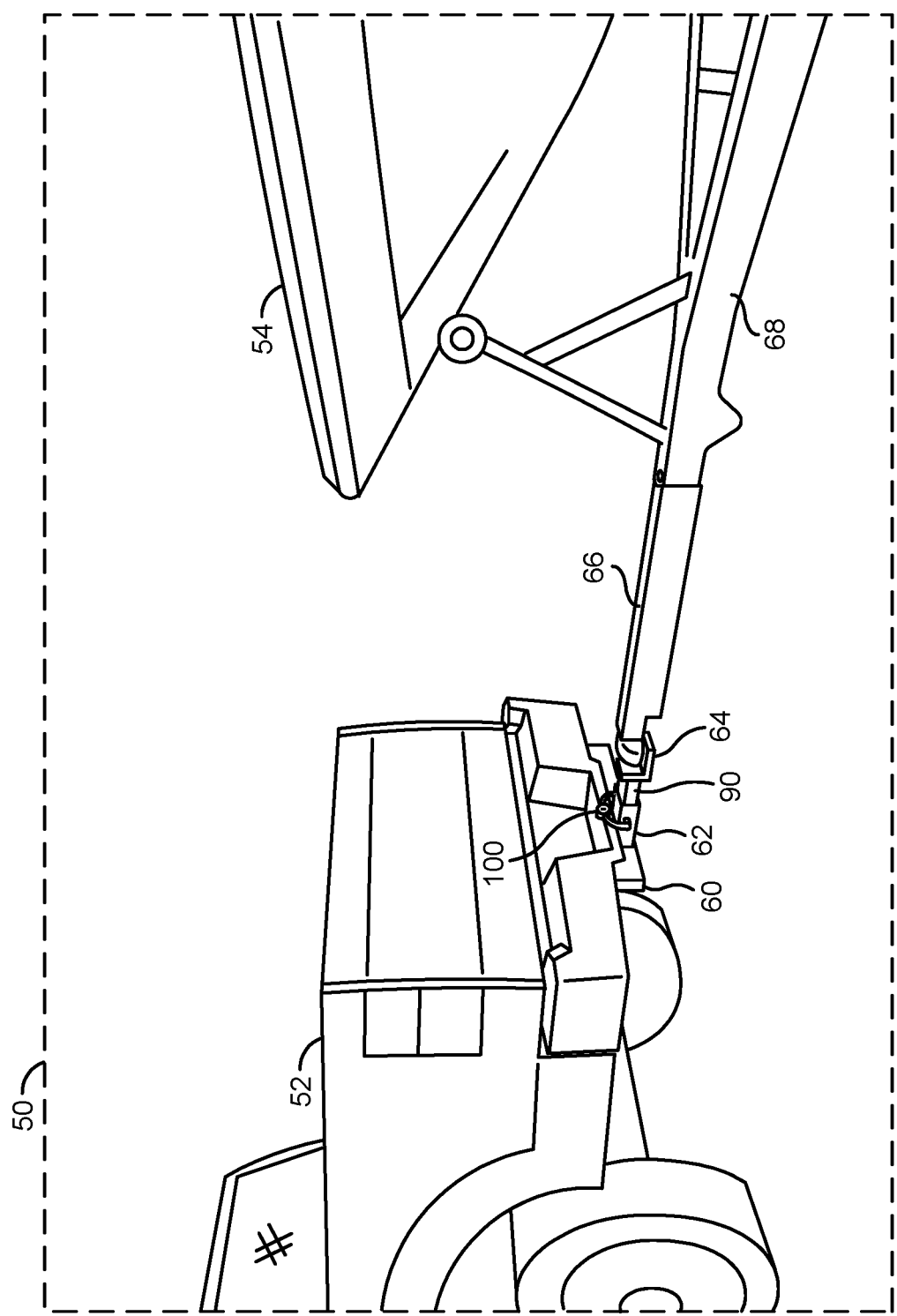
FIG. 1 is a diagram illustrating a context of an example embodiment of the present invention.

Referring to FIG. 1, a diagram illustrating a context of an example embodiment of the present invention is shown. An example context 50 is shown. The example context 50 may illustrate an example implementation of a trailer connection. The example context 50 may comprise a tow vehicle 52 and a trailer vehicle 54. The trailer connection in the example context 50 may be between the tow vehicle 52 and the trailer vehicle 54.

The trailer connection between the tow vehicle 52 and the trailer vehicle 54 may comprise a trailer hitch 60, a receiver tube 62, a ball mount 64, a trailer coupler 66, a trailer 68, a connector 90, and an apparatus (or device) 100. The trailer hitch 60 is shown attached to the tow vehicle 52. In the example shown, the trailer hitch 60 may be a rear mount trailer hitch. In another example, the trailer hitch 60 may be a front mount trailer hitch. The trailer hitch 60 may comprise the receiver tube 62. The ball mount 64 may be removably connected to the trailer coupler 66. The trailer coupler 66 may be connected to the trailer 68. The trailer 68 may be configured to carry the trailer vehicle 54.

In the example shown, the tow vehicle 52 may be a pickup truck (e.g., a light duty vehicle) and the trailer vehicle 54 may be a boat. In some embodiments, the tow vehicle 52 may be a passenger car, a truck, a utility van, a minivan, a sports utility vehicle, an internal combustion engine vehicle, a hybrid electric vehicle, an electric vehicle, etc. In some embodiments, the trailer vehicle 54 may be a personal watercraft (e.g., Sea-Doo), a snowmobile, one or more motorcycles, one or more bicycles, a cargo carrier, a camper, a flatbed, etc. In some embodiments, additional connectors may be implemented (e.g., wires and/or other cables to connect turn and brake signals between the tow vehicle 52 and the trailer 68). The types of the tow vehicle 52 that implements the trailer hitch 60 and/or the type of trailer vehicle 54 that is carried by the trailer 68 may be varied according to the design criteria of a particular implementation.

The connector 90 is shown implemented between the trailer hitch 60 and the trailer coupler 66. The connector 90 may be attached to the ball mount 64. In an example, the connector 90 may be welded to the ball mount 64. In another example, the connector 90 may be connected to the ball mount 64 using one or more rivets. In still another example, the ball mount 64 may be removably attached to the connector 90 (e.g., screwed on using a bolt and nut and/or other fasteners). The type of connection between the connector 90 and the ball mount 64 may be varied according to the design criteria of a particular implementation.

The connector 90 may be configured to provide a secure connection to the receiver tube 62. The connector 90 may be inserted into the receiver tube 62. The connector 90 may ensure that the trailer 68 is connected to the rear mount trailer hitch 60 to enable the tow vehicle 52 to pull the trailer vehicle 54. The connector 90 may implement two locking pins and a biasing mechanism (e.g., a spring). The spring may generate an outwards force on the locking pins. For example, the outwards force generated by the spring may push the locking pins outwards through openings on the receiver tube 62. The locking pins extending through openings on the receiver tube 62 when a shaft of the connector 90 is inserted into the receiver tube 62 may form a secure connection between the connector 90 and the trailer hitch 60. Details of the connection between the connector 90 and the receiver tube 62 and/or details of the locking pins and the biasing mechanism may be described in association with U.S. application Ser. No. 17/884,004, filed on Aug. 9, 2022, appropriate portions of which are incorporated by reference.

The apparatus 100 is shown over the receiver tube 62. The apparatus 100 may be a locking device. The apparatus 100 may be configured to fit around (e.g., partially around) the receiver tube 62. In the example shown, the apparatus 100 may be oriented above the receiver tube 62 and partially in front of a bumper of the towing vehicle 52. In another example, the apparatus 100 may be configured to fit below the bumper of the towing vehicle 52 and/or under the receiver tube 62. The orientation of the apparatus 100 may be varied according to the design criteria of a particular implementation.

The apparatus 100 may be configured to prevent the connector 90 and ball mount 64 from disconnecting from the receiver tube 62. The apparatus 100 may be configured to protect and/or prevent locking pins of the connector 90 from releasing the connection between the connector 90 and the receiver tube 62.

Figure 2:
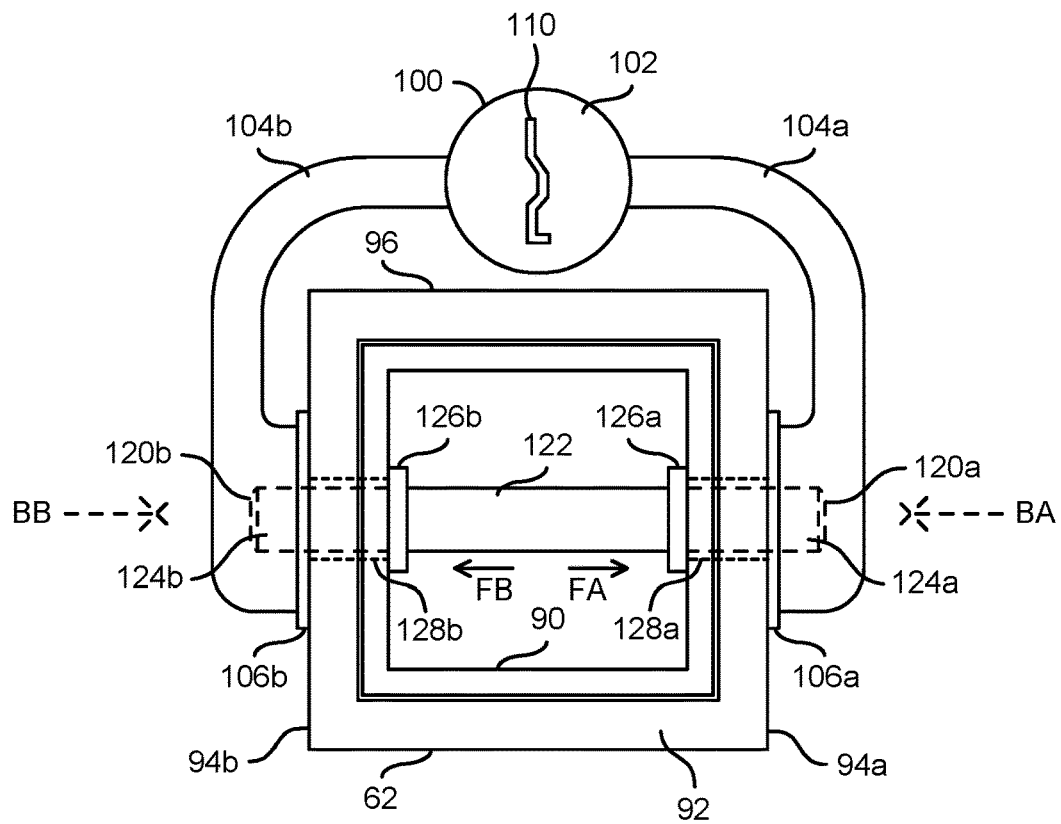
FIG. 2 is a diagram illustrating an example embodiment of the present invention fitting over a receiver tube for a trailer hitch.

Referring to FIG. 2, a diagram illustrating an example embodiment of the present invention fitting over a receiver tube for a trailer hitch is shown. A view head on view of the receiver tube 62 is shown. For example, the view of the receiver tube 62 may be from a perspective of looking directly into the receiver tube 62 (e.g., standing behind the towing vehicle 52 in the example context 50 shown in association with FIG. 1). The apparatus 100 is shown fitting over the receiver tube 62. The connector 90 is shown inserted into the receiver tube 62 in order to provide a connection between the trailer hitch 60 and the trailer coupler 66. For example, the view shown may be a cutaway view looking directly into the connector 90 when the connector 90 is attached to the receiver tube 62.

A receiver opening 92 of the receiver tube 62 is shown. The receiver opening 92 may extend out towards the rear of the tow vehicle 52. The receiver opening 92 may be configured to accept the connector 90 for the trailer coupler 66 and the trailer 68. The receiver opening 92 may be an entry for inserting the connector 90 into the hollow receiver tube 62.

The apparatus 100 may comprise a locking mechanism 102 and arms 104a-104b. In the example shown, the locking mechanism 102 is shown located above the receiver tube 62. In some embodiments, the locking mechanism 102 may be located below the receiver tube 62. The arm 104a is shown attached to one side of the locking mechanism 102. The arm 104b is shown attached to another side of the locking mechanism 102. The arm 104a may extend over and partially around one side 94a of the receiver tube 62 and the arm 104b may extend over and around partially another (e.g., the opposite) side 94*b* of the receiver tube 62. The arms 104*a*-104*b* may be formed to fit around the receiver tube 62. The locking mechanism 102 may be above a top side 96 of the receiver tube 62 and the arms 104*a*-104*b* may extend across the top side 96 and then down along the sides 94*a*-94*b* of the receiver tube 62. The arms 104*a*-104*b* may be shaped to extend across the top side 96 and down the sides 94*a*-94*b* while keeping an amount of space between the locking mechanism 102 and the top side 96 a small amount of distance (e.g., less than an inch of space, one or two centimeters of space, less than a centimeter of space, etc.).

In one example, the material of the locking mechanism 102 and/or the arms 104*a*-104*b* may be an aluminum material. In another example, the locking mechanism 102 and/or the arms 104*a*-104*b* may be a stainless steel material. In yet another example, the locking mechanism 102 and/or the arms 104*a*-104*b* may be a carbon fiber material. In still another example, the locking mechanism 102 and/or the arms 104*a*-104*b* may be a composite material. The material implemented for the locking mechanism 102 and/or the arms 104*a*-104*b* may be resistant to corrosion (e.g., due to moisture from rain, road salts, etc.). The type of material used to implement the locking mechanism 102 and/or the arms 104*a*-104*b* may be varied according to the design criteria of a particular implementation.

Seals 106*a*-106*b* are shown. The seal 106*a* may be located between the arm 104*a* and the side 94*a* of the receiver tube 62. The seal 106*b* may be located between the arm 104*b* and the side 94*b* of the receiver tube 62. The seals 106*a*-106*b* may be configured to prevent the arms 104*a*-104*b* from rotating. For example, preventing the arms 104*a*-104*b* from rotating on the sides 94*a*-94*b* may prevent the locking mechanism 102 from pivoting forwards and backwards (e.g., if the locking mechanism 102 pivots backwards, the locking mechanism 102 may make contact and/or scratch a bumper of the towing vehicle 52). The seals 106*a*-106*b* may be configured to provide weather proofing for the arms 104*a*-104*b* (e.g., prevent water from leaking between the arms 104*a*-104*b* and the sides 94*a*-94*b* of the receiver tube 62).

The seals 106*a*-106*b* may comprise a weatherproof material. In one example, the seals 106*a*-106*b* may be a rubber material. In another example, the seals 106*a*-106*b* may be a neoprene material. In yet another example, the seals 106*a*-106*b* may be an ethylene propylene diene monomer (EDPM) rubber material. In still another example, the seals 106*a*-106*b* may be a silicone material. In yet another example, the seals 106*a*-106*b* may be a fluorosilicone material. The type of material used for implementing the seals 106*a*-106*b* may be varied according to the design criteria of a particular implementation.

The locking mechanism 102 is shown comprising a keyhole 110. The keyhole 110 may enable a user to lock or unlock the locking mechanism 102. In an example, the arms 104*a*-104*b* may be connected together with the locking mechanism 102 and locked using the keyhole 110 to form a secure connection between the locking mechanism 102 and the arms 104*a*-104*b*. For example, one of the arms 104*a*-104*b* and/or the locking mechanism 102 may be separated from each other and locking the arms 104*a*-104*b* and/or the locking mechanism 102 may enable the apparatus 100 to be connected as a single unit.

Locking the locking mechanism 102 may enable a secure connection of the arms 104*a*-104*b* to the sides 94*a*-94*b* of the receiver tube 62 (e.g., ensure a tight fit). Unlocking the locking mechanism 102 may enable the arms 104*a*-104*b* to be released from the receiver tube 62. The keyhole 110 is shown on a face of the locking mechanism 102 in a directly parallel orientation with the receiver tube 62. In some embodiments, the keyhole 110 may be angled away from the receiver tube 62 (e.g., at an oblique angle) to provide easier access to the keyhole 110. When the locking mechanism 102 is locked together with the arms 104*a*-104*b* partially around the receiver tube 62, the apparatus 100 may not be pulled away from and/or pulled off of the receiver tube 62.

Locking pins 120*a*-120*b* are shown extending from the connector 90. For example, the locking pin 120*a* may extend from the connector 90 and out through the side 94*a* of the receiver tube 62 and the locking pin 120*b* may extend from the connector 90 and out through the side 94*b* of the receiver tube 62. A device 122 may be implemented between the locking pins 120*a*-120*b*. The device 122 may comprise a biasing mechanism configured to provide an outwards force that pushes the locking pins 120*a*-120*b* through the sides of the connector 90 and through the sides 94*a*-94*b* of the receiver tube 62. In one example, the biasing mechanism 122 may be a spring.

The locking pins 120*a*-120*b* extending through the sides of the connector 90 and the sides 94*a*-94*b* of the receiver tube 62 may provide a connection between the connector 90 and the receiver tube 62 (e.g., prevent the connector 90 from sliding out of the receiver tube 62). The locking pins 120*a*-120*b* may be pressed inwards (e.g., to compress the biasing mechanism 122) to release the connection between the connector 90 and the receiver tube 62. Arrows FA and FB are shown. The arrows FA-FB may represent the outward force provided by the biasing mechanism 122 to the locking pins 120*a*-120*b*. The outward forces FA-FB may enable the locking pins 120*a*-120*b* to extend through the connector 90 and the receiver tube 62. Applying a force against the locking pins 120*a*-120*b* that opposes and overcomes the outward forces FA-FB may cause the biasing mechanism 122 to compress and enable the locking pins 120*a*-120*b* to be pressed inside the connector 90 and the receiver tube 62.

The locking pins 120*a*-120*b* may comprise a respective narrow portion 124*a*-124*b* and a respective wide portion 126*a*-126*b*. Openings 128*a*-128*b* may extend through the sides of the connector 90 and the respective sides 94*a*-94*b* of the receiver tube 62. For example, the connector 90 may have openings on each side that may align with openings on the sides 94*a*-94*b* of the receiver tube 62 to provide the continuous openings (e.g., through holes) 128*a*-128*b*.

The locking pins 120*a*-120*b* may fit through the respective openings 128*a*-128*b* in order to securely attach the connector 90 to the receiver tube 62. The wide portions 126*a*-126*b* of the locking pins 120*a*-120*b* may be pushed up against the inner sides of the connector 90 by the outward forces FA-FB from the biasing mechanism 122. The wide portions 126*a*-126*b* may be wider than the openings 128*a*-128*b* to prevent the locking pins 120*a*-120*b* from being pushed out of the connector 90. The narrow portions 124*a*-124*b* may be sized to fit through the openings 128*a*-128*b*. For example, outward forces FA-FB from the biasing mechanism 122 may push the narrow portions 124*a*-124*b* outwards through the openings 128*a*-128*b* to enable the secure connection between the connector 90 and the receiver tube 62. Pushing the narrow portions 124*a*-124*b* inwards (e.g., to overcome the outwards forces FA-FB of the biasing mechanism 122) may compress the biasing mechanism 122 and force the locking pins 120*a*-120*b* into the receiver tube 62 and/or the connector 90, which may release the connector 90 from the receiver tube 62. For example, when the locking pins 120*a*-120*b* are exposed out of the sides 94*a*-94*b* of the receiver tube 62, the locking pins 120a-120b may be used to disconnect the connector 90 and the receiver tube 62.

The arms 104a-104b may be configured to fit over the locking pins 120a-120b. For example, the arms 104a-104b may cover the narrow portions 124a-124b (e.g., the narrow portions 124a-124b may fit into the arms 104a-104b, respectively). The arms 104a-104b may be configured to prevent the locking pins 120a-120b from being pressed. Preventing the locking pins 120a-120b from being pressed may prevent the release of the connection between the connector 90 and the receiver tube 62. While the locking mechanism 102 is locked, the locking pins 120a-120b may not be accessible to pressed. To press the locking pins 120a-120b (e.g., to disconnect the connector 90 from the receiver tube 62), the locking mechanism 102 may be unlocked and the arms 104a-104b may be removed from the locking pins 120a-120b first, and then the locking pins 120a-120b may be pressed.

Dashed arrows BA-BB are shown. The dashed arrows BA-BB may represent an inward force applied to the arms 104a-104b that may be blocked from reaching the locking pins 120a-120b. For example, without the arms 104a-104b protecting the locking pins 120a-120b, the inward forces BA-BB may overcome the outward forces FA-FB and cause the locking pins 120a-120b to be pressed within the openings 128a-128b. The arms 104a-104b may absorb and/or block the inward forces BA-BB and prevent the inward forces BA-BB from being transferred to the locking pins 120a-120b. By blocking the inward forces BA-BB, the arms 104a-104b may prevent the locking pins 120a-120b from releasing the connection between the connector 90 and the receiver tube 62. For example, the structure and/or materials of the apparatus 100 may prevent the inward forces BA-BB from being applied to the locking pins 120a-120b that may overcome the outward forces FA-FB of the biasing mechanism 122.

The arms 104a-104b may be implemented with a rigid structure. For example, the arms 104a-104b may not be pressed and/or compressed inwards. For example, pressing on the arms 104a-104b with the inward forces BA-BB where the arms 104a-104b cover the locking pins 120a-120, may not transfer an inwards force to the locking pins 120a-120b. Generally, with the apparatus 100 connected to the receiver tube 62, with the arms 104a-104b covering the locking pins 120a-120b, the apparatus 100 may not be pulled away from and/or detached from the receiver tube 62 and the connector 90 may not be disconnected from the receiver tube 62 using the locking pins 120a-120b.

The arms 104a-104b fitting over the locking pins 120a-120b and the seals 106a-106b pressing against the sides 94a-94b of the receiver tube 62 may provide a snug fit between the apparatus 100 and the receiver tube 62. For example, due to the snug fit created using the seals 106a-106b and the arms 104a-104b, the apparatus 100 may not significantly move, pivot and/or flop around while connected to the receiver tube 62. In an example, the width of the receiver tube 62 may be approximately two inches. To provide the snug fit, the distance between the arms 104a-104b may be approximately two inches and/or slightly longer. The apparatus 100 may be implemented with a larger or smaller width between the arms 104a-104b depending on the size of the receiver tube 62. In an example, the arms 104a-104b may provide a compression fit against the sides 94a-94b of the receiver tube 62 to prevent the apparatus 100 from pivoting. The size of the apparatus 100 may be varied according to the design criteria of a particular implementation.

Figure 3:
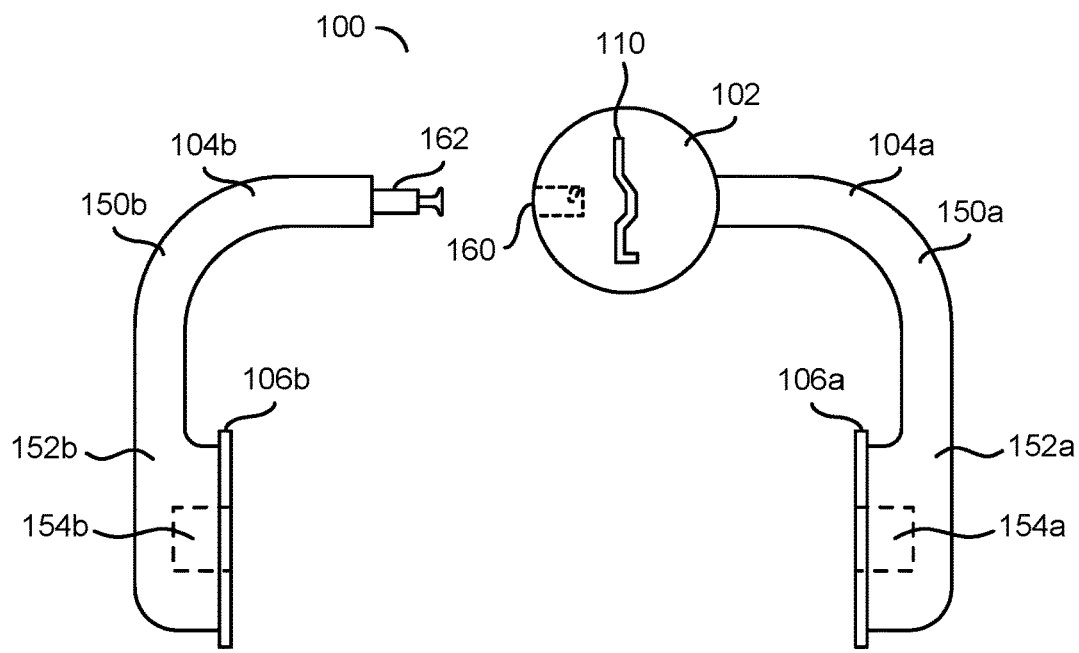
FIG. 3 is a diagram illustrating an arm of the apparatus removably attached to a locking mechanism.

Referring to FIG. 3, a diagram illustrating an arm of the apparatus removably attached to a locking mechanism is shown. The arm 104a is shown attached to the locking mechanism 102. The arm 104a may not be detached from the locking mechanism 102 (e.g., the arm 104a and the locking mechanism 102 may be implemented as a single piece and/or portion of the apparatus 100). In one example, the arm 104a may be welded to the locking mechanism 102. In another example, the arm 104a may be riveted to the locking mechanism 102. In yet another example, the arm 104a and the locking mechanism 102 may be molded as one continuous piece. The method of attaching and/or forming the locking mechanism 102 to the arm 104a may be varied according to the design criteria of a particular implementation.

The arm 104b is shown disconnected from the locking mechanism 102. The arm 104b may be implemented as a separate piece and/or portion of the apparatus 100 from the locking mechanism 102 and the arm 104a. The arm 104b may be removably attached to the locking mechanism 102. For example, when the arm 104b is attached to the locking mechanism 102, the apparatus 100 may be a single device comprising the locking mechanism 102 and the arms 104a-104b.

The arms 104a-104b may comprise curved portions 150a-150b, end portions 152a-152b and openings 154a-154b, respectively. The curved portions 150a-150b may comprise a bend. In an example, in the orientation shown, the curved portions 150a-150b may bend the shape of the arms 104a-104b downwards from the locking mechanism 102. In an example with the locking mechanism 102 implemented below the receiver tube 62, the curved portions 150a-150b may bend shape of the arms 104a-104b upwards from the locking mechanism 102. The curved portions 150a-150b may extend to ends 152a-152b. The ends 152a-152b may be configured to fit against the sides 94a-94b of the receiver tube 62. The seals 106a-106b may be implemented on the ends 152a-152b. The seals 106a-106b may be configured to fit around the openings 154a-154b. The openings 154a-154b may be implemented at the ends 152a-152b. The curved portions 150a-150b and the ends 152a-152b of the arms 104a-104b may be a rigid structure that does not bend or twist. In an example, a distance between the ends 152a-152b at the openings 154a-154b may be approximately the same distance as the width (e.g., between the sides 94a-94b) of the receiver tube 62 (e.g., approximately two inches apart).

The opening 154a is shown extending into the end 152a of the arm 104a and the opening 154b is shown extending into the end 152b of the arm 104b. The openings 154a-154b may extend through the seals 106a-106b and form a blind hole within the ends 152a-152b. The openings 154a-154b may provide a hollow space within ends 152a-152b of the arms 104a-104b. The openings 154a-154b may be configured to fit over the locking pins 120a-120b. In an example, the openings 154a-154b may be sized large enough for the narrow portions 124a-124b of the locking pins 120a-120b to fit inside. In one example, a diameter of the narrow portions 124a-124b of the locking pins may be approximately ¾ of an inch and the diameter of the openings 154a-154b of the ends 152a-152b may be approximately ¾ of an inch or slightly larger to enable the narrow portions 124a-124b to fit snugly inside.

In some embodiments, the narrow portions 124a-124b of the locking pins 120a-120b may implement a cylindrical shape and the openings 154a-154b may have a cylindrical shape in order to accept the locking pins 120a-120b. In some embodiments, the narrow portions 124a-124b of the locking pins 120a-120b may comprise ridges and/or flat edges. For example, the locking pins 120a-120b may have a square shape and/or a hexagonal shape. The shape of the openings 154a-154b may similarly have the square shape and/or hexagonal shape in order to fit together with the locking pins 120a-120b. In embodiments, where the locking pins 120a-120b comprise flat edges, the shape of the openings 154a-154b may be configured to prevent the apparatus 100 from rotating on the locking pins 120a-120b. For example, the shape of the openings 154a-154b may create a lock with the shape of the locking pins 120a-120b to hold the apparatus 100 in a particular position to prevent the apparatus 100 from pivoting.

The arms 104a-104b may be configured to cover the locking pins 120a-120b by inserting the narrow portions 124a-124b of the locking pins 120a-120b into the respective openings 154a-154b when attaching the apparatus 100 to the receiver tube 62. The ends 152a-152b of the arms 104a-104b may be formed as a cup shape implementing the openings 154a-154b that fit over the locking pins 120a-120b. The ends 152a-152b may fit over the locking pins 120a-120b with the narrow portions 124a-124b of the locking pins 120a-120b inside the openings 154a-154b. The openings 154a-154b may extend deep enough into the ends 152a-152b such that the ends 152a-152b do not cause the locking pins 120a-120b to be pushed into the openings 128a-128b of the receiver tube 62 when the apparatus 100 is connected (e.g., attaching the apparatus 100 may not cause the locking pins 120a-120b to be pushed inwards and cause the connector 90 to disconnect from the receiver tube 62). For example, a depth of the openings 154a-154b may be approximately the same as the amount of distance that the narrow portions 124a-124b of the locking pins 120a-120b extend past the sides 94a-94b of the receiver tube 62. The depth of the openings 154a-154b may be sized to fit the length of the narrow portions 124a-124b of the locking pins 120a-120b. In an example, the depth of the openings 154a-154b may be less than an inch deep.

The locking mechanism 102 may comprise a locking connector 160. The locking connector 160 may be configured to removably attach to a locking connector 162 implemented by the arm 104b. The locking connector 162 may be implemented on the curved portion 150b of the arm 104b that is opposite to the end 152b. In the example shown, the locking connector 162 of the arm 104b may be inserted into the locking connector 160 (e.g., the locking connector 162 may be a male component and the locking connector 160 on the locking mechanism 102 may be a female component). In another example, the locking connector 160 of the locking mechanism 102 may be inserted into the locking connector 162 of the arm 104b (e.g., the locking connector 162 may be a female component and the locking connector 160 may be a male component that extends from the locking mechanism 102). In the example shown, the locking connector 162 of the arm 104b may have a knob shape that slides into the locking connector 160 and the locking connector 160 in the locking mechanism 102 may comprise a hook that may securely grab onto the knob shape of the locking connector 162 when the keyhole 110 is used to lock the locking mechanism 102 and release the knob shape of the locking connector 162 when the keyhole 110 is used to unlock the locking mechanism 102.

When the locking mechanism 102 is locked, the locking connector 160 and the locking connector 162 may provide a secure connection between the locking mechanism 102 and the arm 104b. For example, locking the locking connector 160 with the locking connector 162 may prevent the arm 104b from being pulled away from the locking mechanism 102. Securing the locking connector 160 with the locking connector 162 may result in the apparatus 100 to be one unit comprising the locking mechanism 102 that may not be pulled apart from the arms 104a-104b (e.g., without first unlocking the locking mechanism 102). When the locking mechanism 102 is unlocked, the locking connector 160 may release the locking connector 162 and the arm 104b may be detached from the locking mechanism 102.

In the example shown, the locking connector 162 is shown implemented on the arm 104b and the arm 104a is shown formed to the locking mechanism 102. In another example, the locking connector 162 may be implemented on the arm 104a and the arm 104b may be formed to the locking mechanism 102. Which of the arms 104a-104b is formed to the locking mechanism 102 and which of the arms 104a-104b is removably attached to the locking mechanism 102 via the locking connectors 160-162 may be varied according to the design criteria of a particular implementation.

Figure 4:
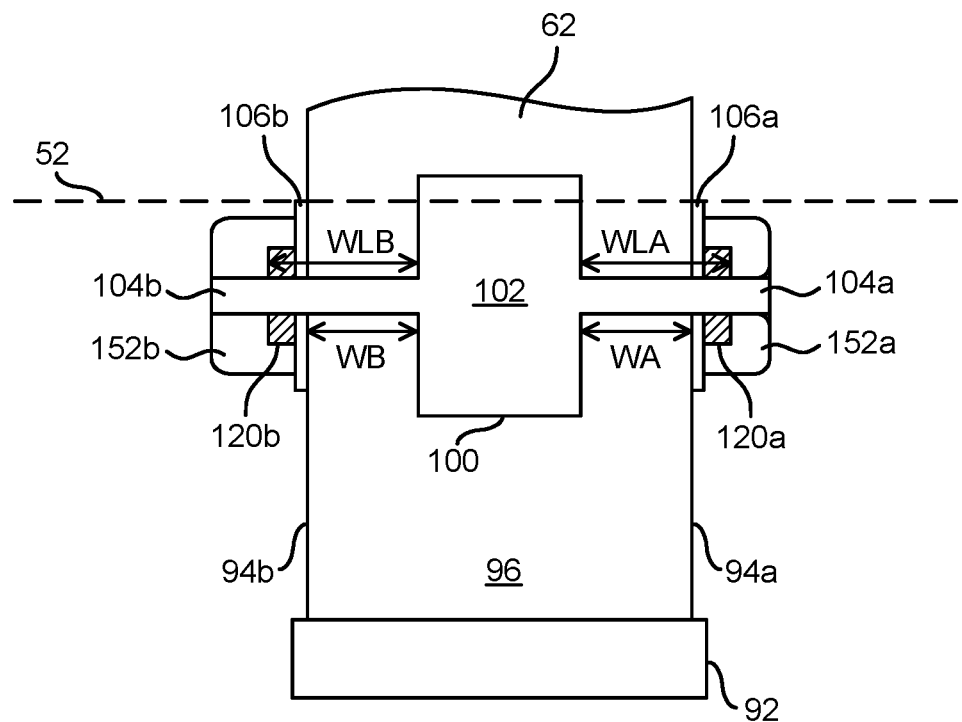
FIG. 4 is a diagram illustrating a top down view of the apparatus connected to the receiver tube.

Referring to FIG. 4, a diagram illustrating a top down view of the apparatus connected to the receiver tube is shown. The apparatus 100 is shown connected to the receiver tube 62. The connector 90 (not shown) may be inserted into the receiver opening 92 of the receiver tube 62. The locking pins 120a-120b may extend from the sides 94a-94b of the receiver tube 62.

The locking mechanism 102 is shown above the top side 96 of the receiver tube 62. The arms 104a-104b are shown extending from the locking mechanism 102 and perpendicular to the locking mechanism 102 and the sides 94a-94b of the receiver tube 62. For example, the curved portions 150a-150b may extend out from the sides of the locking mechanism 102 in a direction perpendicular to the sides 94a-94b of the receiver tube 62. The curved portions 150a-150b may then extend down along the sides 94a-94b of the receiver tube 62. The ends 152a-152b of the arms 104a-104b and the seals 106a-106b may be tight against the sides 94a-94b of the receiver tube 62.

The locking mechanism 102 is shown above the top side 96 of the receiver tube 62 and centered in between the two locking pins 120a-120b. The arms 104a-104b may wrap around the receiver tube 62 and cover the locking pins 120a-120b. The tow vehicle 52 is shown located above the locking mechanism 102 (e.g., a bumper of the tow vehicle 52). For example, the locking mechanism 102 may be partially or entirely under the bumper of the tow vehicle 52.

A distance WLA and a distance WLB are shown. The distances WLA-WLB may represent a distance from a side of the locking mechanism 102 to the end of the narrow portions 124a-124b of the locking pins 120a-120b. A distance WA and a distance WB are shown. The distances WA-WB may represent a distance from the sides of the locking mechanism 102 to the sides 94a-94b of the receiver tube 62. The distances WA-WB may also represent distance from the sides of the locking mechanism 102 to the seals 106a-106b at the ends 152a-152b of the arms 104a-104b.

Since the distances WLA-WLB may be longer than the distances WA-WB, the apparatus 100 may not be able to slip onto or off of the locking pins 120a-120b when the arms 104a-104b are locked to the locking mechanism 102. For example, with the locking mechanism 102 and the arms 104a-104b connected, the apparatus 100 may not be capable of fitting over top of the receiver tube 62 and the locking pins 120a-120b.

In order to attach the apparatus 100, one of the arms 104a-104b may be disconnected from the locking mechanism 102 (e.g., by unlocking the keyhole 110 and disconnecting the locking connectors 160-162). Then the opening 154a of the end 152a on the arm 104a may be placed onto the locking pin 120a. Since the locking mechanism 102 is connected to the arm 104a, the locking mechanism 102 may be above the top side 96 of the receiver tube 62 when the opening 154a is placed onto the locking pin 120a. Then, the opening 154b of the end 152b on the arm 104b may be placed onto the locking pin 120b with the locking connector 162 aligned with the locking connector 160 on the locking mechanism 102. As the opening 154b is pushed over the locking pin 120b, the locking connectors 160-162 may connect together and the arm 104b may be securely attached to the locking mechanism 102.

For example, to account for the differences in the distances WLA-WLB and the distances WA-WB, the apparatus 100 may be separated before attaching onto the receiver tube 62. Due to the difference in the distances WLA-WLB, and the distance WA-WB, the apparatus 100 may not be pulled off of the receiver tube 62, without the arms 104a-104b first being separated from the locking mechanism 102. The depth of the openings 154a-154b may be approximately the difference between the distances WLA-WLB and the distances WA-WB.

Figure 5:
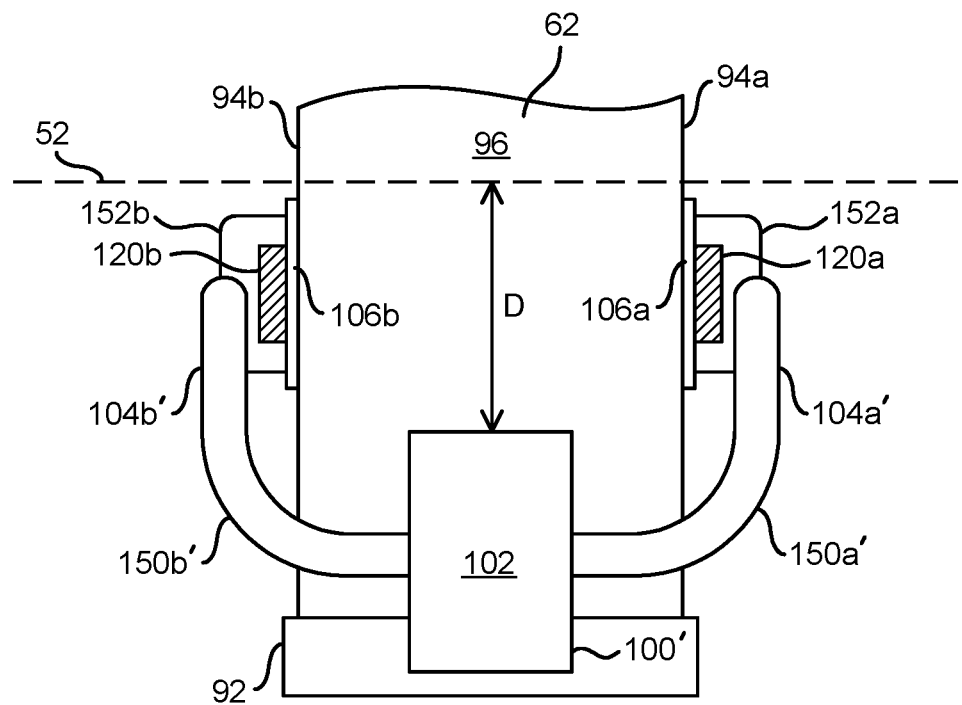
FIG. 5 is a diagram illustrating a top down view of an alternate embodiment of the apparatus connected to the receiver tube.

Referring to FIG. 5, a diagram illustrating a top down view of an alternate embodiment of the apparatus connected to the receiver tube is shown. The apparatus 100' is shown connected to the receiver tube 62. The connector 90 (not shown) may be inserted into the receiver opening 92 of the receiver tube 62. The locking pins 120a-120b may extend from the sides 94a-94b of the receiver tube 62.

The locking mechanism 102 is shown above top side 96 of the receiver tube 62. The arms 104a'-104b' may be curved and/or angled. The curved/angled arms 104a'-104b' are shown extending from the sides of the locking mechanism 102. The curved/angled arms 104a'-104b' may extend down and partially around the sides 94a-94b of the receiver tube 62 and may be angled to reach the locking pins 120a-120b. The curved/angled arms 104a'-104b' may have the curved portions 150a'-150b' that may extend from the locking mechanism 102 and perpendicular to the locking mechanism 102 and the sides 94a-94b of the receiver tube 62 and then curve away from the locking mechanism 102 and towards the locking pins 120a-120b. For example, the curved portions 150a'-150b' may be perpendicular to the sides 94a-94b and the locking mechanism 102 until the curved portions 150a'-150b' clear the sides 94a-94b of the receiver tube 62. Then the curved portions 150a'-150b' may extend down and away from the locking mechanism 102 along the sides 94a-94b of the receiver tube 62 until the ends 152a-152b of the curved/angled arms 104a'-104b' reach the locking pins 120a-120b. The seals 106a-106b may be tight against the sides 94a-94b of the receiver tube 62.

The curved/angled arms 104a'-104b' may enable the locking mechanism 102 to be offset from the location of the locking pins 120a-120b (e.g., not centered in between the locking pins 120a-120b as shown in association with FIG. 4). The locking mechanism 102 may be generally centered along a width of the receiver tube, as shown in association with FIG. 4, but may not be located directly in between the locking pins 120a-120b. The distances WLA-WLB and the distance WA-WB (not shown, for clarity), may be the same lengths as described in association with FIG. 4. For example, even with the curved/angled arms 104a'-104b', apparatus 100' may not be attached to the receiver tube 62 with the ends 152a-152b covering the locking pins 120a-120b while both of the curved/angled arms 104a'-104b' are secured to the locking mechanism 102. Similarly, even with the curved/angled arms 104a'-104b', the apparatus 100' may not be pulled away from the receiver tube 62 unless one of the curved/angled arms 104a'-104b' are unlocked and disconnected from the locking mechanism 102.

A distance D is shown. A distance D may represent a distance of the locking mechanism 102 from the tow vehicle 52 (e.g., the bumper of the tow vehicle 52). For example, the locking mechanism 102 may be offset a distance D from the tow vehicle 52. The curved/angled arms 104a'-104b' may enable the ends 152a-152b to reach the locking pins 120a-120b while the locking mechanism is offset the distance D from the bumper of the tow vehicle 52. By offsetting the locking mechanism 102 and implementing the curved/angled arms 104a'-104b', the apparatus 100' may lean forwards towards the ball mount 64 and/or the connector 90 instead of being under the bumper. By leaning the locking mechanism 102 forward, the keyhole 110 may be easier to access.

Figure 6:
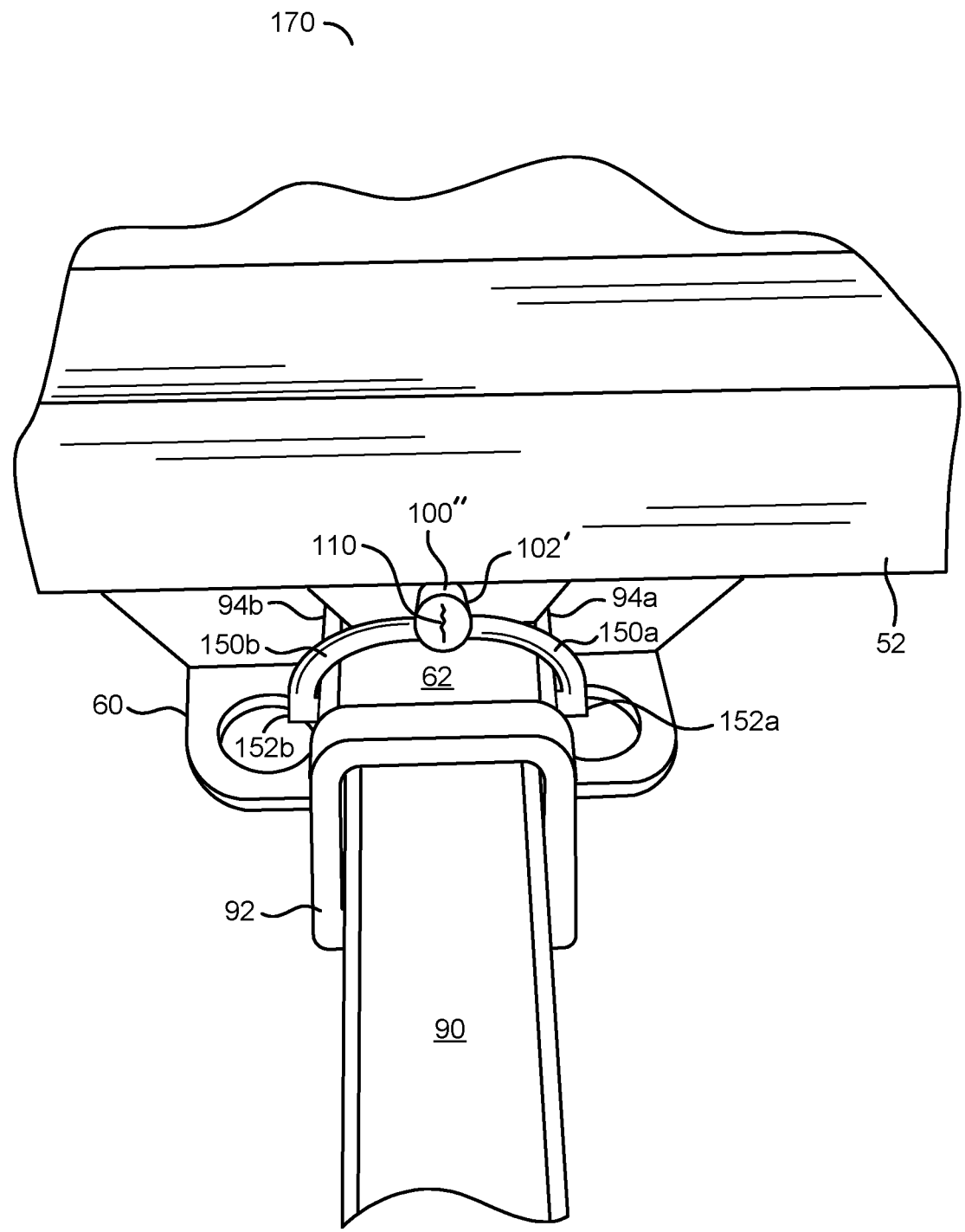
FIG. 6 is a diagram illustrating an apparatus securing locking pins inserted into a trailer hitch receiver.

Referring to FIG. 6, a diagram illustrating an apparatus securing locking pins inserted into a trailer hitch receiver is shown. A view 170 of a connection between the apparatus 100" and the receiver tube 62 is shown. The view 170 may comprise a portion of the tow vehicle 52 (e.g., a rear bumper). The trailer hitch 60 is shown attached to the tow vehicle 52 and extending from below the bumper of the tow vehicle 52. The trailer hitch 60 may provide a secure connection to the tow vehicle 52. The receiver tube 62 is shown extending from the trailer hitch 60.

The connector 90 may be inserted in the receiver tube 62. The receiver opening 92 of the receiver tube 62 is shown. The receiver opening 92 may extend out away from the rear of the tow vehicle 52. The receiver opening 92 may be configured to accept the connector 90 for the trailer coupler 66 and the trailer 68. The receiver opening 92 may be an entry for inserting the connector 90 into the hollow receiver tube 62. The biasing mechanism 122 may be compressed and the locking pins 120a-120b may be pushed into the connector 90 as the connector 90 is pushed into the receiver opening 92. When the locking pins 120a-120b reach the openings 128a-128b (as shown in association with FIG. 1), the locking pins 120a-120b may be pushed outwards by the biasing mechanism 122 and the secure connection may be established between the connector 90 and the receiver tube 62. The connector 90 may not be removed from the receiver tube 62 unless the locking pins 120a-120b are pushed into the openings 128a-128b and the connector 90 is pulled out. After the secure connection is established between the connector 90 and the receiver tube 62, the apparatus 100" may be attached over the locking pin 120a-120b and to the receiver tube 62.

The apparatus 100" may be attached to the receiver tube 62 to cover/protect the locking pins 120a-120b. For example, the locking pins 120a-120b are not shown protruding from the respective sides 94a-94b of the receiver tube 62 because the locking pins 120a-120b may be under (e.g., covered by) the ends 152a-152b of the arms 104a-104b of the apparatus 100". The curved portions 150a-150b of the arms 104a-104b may extend over and partially around the receiver tube 62. The ends 152a-152b may be pressed against the sides 94a-94b of the receiver tube 62. The ends 152a-152b may block the inward forces BA-BB from being applied to the locking pins 120a-120b. For example, an inward forces BA-BB applied to the ends 152a-152b may be absorbed by the ends 152a-152b without transferring the inward forces BA-BB to the locking pins 120a-120b. Without any inward force being able to be applied to the locking pins 120a-120b while the ends 152a-152b cover the locking pins 120a-120b, the outward force provided by the biasing mechanism 122 may keep the locking pins 120a-120b through the openings 128a-128b and within the openings 154a-154b of the ends 152a-152b. Since the outward forces FA-FB may not be overcome, the locking pins 120a-120b may maintain the secure connection between the connector 90 and the receiver tube 62 while the apparatus 100" is attached.

The apparatus 100" may be partially under the bumper. The locking mechanism 102' is shown partially under the bumper of the tow vehicle 52. The locking mechanism 102' may be implemented with a face of the locking mechanism 102' (e.g., the face with the keyhole 110) angled upwards. With the locking mechanism 102' angled upwards, the curved portions 150a-150b of the arms 104a-104b may still extend out from the sides of the locking mechanism 102' as shown in association with FIG. 3. The locking mechanism 102' may be angled upwards to facilitate access to the keyhole 110. For example, with the face of the locking mechanism 102' angled upwards, a person may be able to push a key into the keyhole 110 without potentially bumping into the top of the receiver tube 62.

Figure 7:
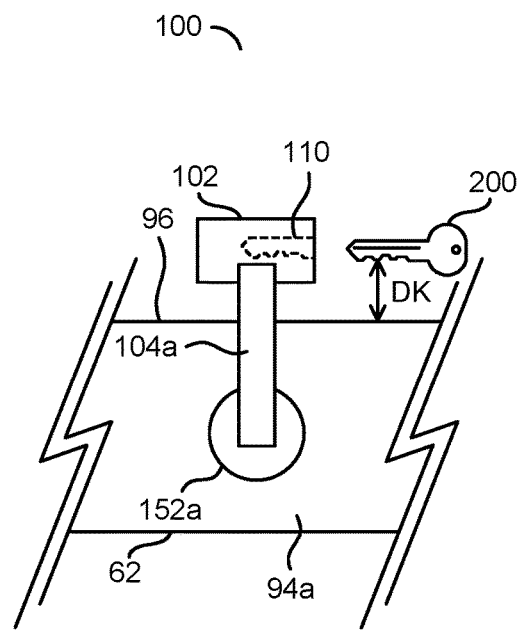
FIG. 7 is a diagram illustrating a side view of the apparatus connected to a trailer hitch receiver tube.

Referring to FIG. 7, a diagram illustrating a side view of the apparatus connected to a trailer hitch receiver tube is shown. A view of the apparatus 100 is shown. One side 94a of the receiver tube 62 is shown. One arm 104a is shown wrapping around the side 94a of the receiver tube 62 from above the top side 96 of the receiver tube 62. The other arm 104b (not shown) may similarly wrap around on the other side 94b of the receiver tube 62. The locking mechanism 102 is shown above the top side 96 of the receiver tube 62. The arms 104a-104b are shown extending straight down from the locking mechanism 102 (e.g., after clearing the top side 96, which may not be visible from the perspective shown) to cover the locking pins 120a-120b. The end 152a of the arm 104a may cover the locking pin 120a.

The locking mechanism 102 may be oriented parallel to the receiver tube 62. The keyhole 110 may be directed parallel to the receiver tube 62 from the face of the locking mechanism 102. A key 200 may be used to unlock/lock the apparatus 100. In an example of attaching the apparatus 100 to the receiver tube 62, the end 152a of the arm 104a may be placed over the locking pin 120 with the locking mechanism 102 above the receiver tube 62. Then the lock connector 162 of the arm 104b may be inserted into the lock connector 160 of the locking mechanism 102, while the end 152b is placed over the locking pin 120b. The key 200 may be inserted into the keyhole 110 and turned to lock the arm 104b to the locking mechanism 102 and the apparatus 100 may be attached to the receiver tube 62 and the locking pins 120a-120b may be covered/protected. In an example of removing the apparatus 100 from the receiver tube 62, the key 200 may be inserted into the lock 110 and turned to unlock the arm 104b from the locking mechanism 102 by releasing the lock connector 162 from the lock connector 160. The arm 104b may be pulled away from the locking mechanism 102 and pulled off of the locking pin 120b. Then the arm 104a may be pulled off of the locking pin 120a.

A distance DK is shown. The distance DK may be a distance from the top side 96 of the receiver tube 62 and the key 200. When the locking mechanism 102 is oriented with the keyhole 110 parallel to the top side 96 of the receiver tube 62, the distance DK may be relatively small. For example, a user may have some difficulty easily accessing the keyhole 110 with a parallel approach with respect to the top side 96 of the receiver tube 62. The length of the distance DK may depend upon the length of the arms 104a-104b. Generally, a short length of the arms 104a-104b may be preferred to prevent the apparatus 100 from pivoting, to fit the apparatus under the bumper of the tow vehicle 52, and/or for aesthetics. The length of the arms 104a-104b may be varied according to the design criteria of a particular implementation.

Figure 8:
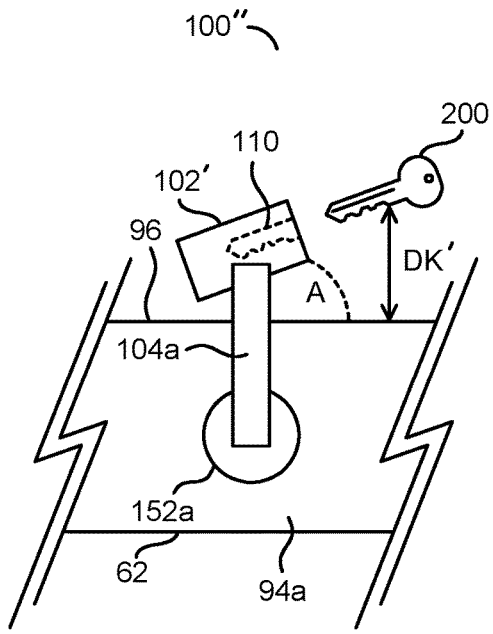
FIG. 8 is a diagram illustrating a side view of the apparatus with an angled locking mechanism connected to a trailer hitch receiver tube.

Referring to FIG. 8, a diagram illustrating a side view of the apparatus with an angled locking mechanism connected to a trailer hitch receiver tube is shown. A view of the apparatus 100" is shown. The view of the apparatus 100" may be similar to the view of the apparatus 100 shown in association with FIG. 7. One side 94a of the receiver tube 62 is shown. One arm 104a is shown wrapping around the side 94a of the receiver tube 62 from above the top side 96 of the receiver tube 62. The other arm 104b (not shown) may similarly wrap around on the other side 94b of the receiver tube 62. The locking mechanism 102' is shown above the top side 96 of the receiver tube 62. The arms 104a-104b are shown extending straight down from the locking mechanism 102' (e.g., after clearing the top side 96, which may not be visible from the perspective shown) to cover the locking pins 120a-120b. The end 152a of the arm 104a may cover the locking pin 120a. The key 200 is shown near the keyhole 110.

The locking mechanism 102' may have an angled orientation with respect to the top side 96 of the receiver tube 62. The keyhole 110 may be similarly directed with an angled orientation to the top side 96 of the receiver tube 62. An angle A is shown. The angle A may be an angle between the locking mechanism 102' and the top side 96 of the receiver tube 62. The locking mechanism 102' may be angled upwards (e.g., away) from the top side 96 of the receiver tube 62. For example, the locking mechanism 102' may be angled with the angle A at approximately 27.5 degrees to 45 degrees. The amount of the angle A for the locking mechanism 102' may be varied according to the design criteria of a particular implementation.

Angling the locking mechanism 102' may provide easier access and/or more ergonomic access for inserting the key 200 into the keyhole 110. In an example, for a user, approaching the keyhole 110 at the angle A may be more convenient than approaching the keyhole 110 parallel to the top side 96 of the receiver tube 62. The distance DK' is shown between the key 200 and the top side 96 of the receiver tube 62. The distance DK' may be larger than the distance DK shown in association with FIG. 7 (e.g., the parallel embodiment). A larger distance DK' may provide more room for the hands of the user holding the key 200.

Figure 9:
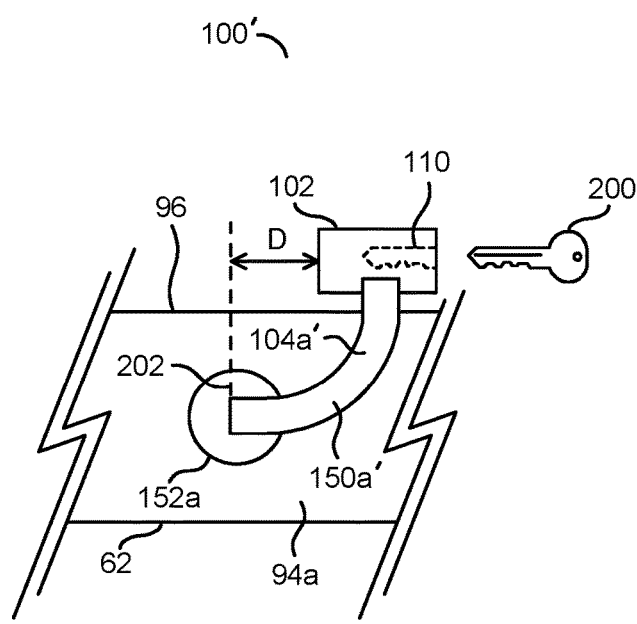
FIG. 9 is a diagram illustrating a side view of the alternate embodiment apparatus connected to a trailer hitch receiver tube.

Referring to FIG. 9, a diagram illustrating a side view of the alternate embodiment apparatus connected to a trailer hitch receiver tube is shown. A view of the apparatus 100' is shown. The view of the apparatus 100' may be similar to the view of the apparatus 100 shown in association with FIG. 7. One side 94a of the receiver tube 62 is shown. One arm 104a' is shown wrapping around the side 94a of the receiver tube 62 from above the top side 96 of the receiver tube 62. The other arm 104b' (not shown) may similarly wrap around on the other side 94b of the receiver tube 62. The locking mechanism 102 is shown above the top side 96 of the receiver tube 62. The arms 104a'-104b' are shown extending down from the locking mechanism 102' and, after clearing the top side 96, may be curved towards the locking pins 120a-120b to cover the locking pins 120a-120b. The end 152a of the arm 104a' may cover the locking pin 120a. The key 200 is shown near the keyhole 110.

One curved/angled arm 104a' is shown wrapping around the side 94a of the receiver tube 62 down from the top side 96. The other curved/angled arm 104b' (not shown) may similarly wrap around on the other side 94b of the receiver tube 62. The locking mechanism 102 may be oriented parallel to the receiver tube 62. The keyhole 110 may be directed parallel to the receiver tube 62 from the face of the locking mechanism 102. In other embodiments of the apparatus 100' implementing the curved arms 104a'-104b', the angled locking mechanism 102' may be implemented to provide the approach angle A to the keyhole 110 for the key 200. The locking mechanism 102 is shown above the top side 96 of the receiver tube 62. The curved portion 150a' of the angled arm 104' is shown extending down from the locking mechanism 102 and curved back to reach the location of the locking pin 120a.

The curved/angled arms 104a'-104b' may enable the locking mechanism 102 to be offset in front of the location of the locking pins 120. A dotted line 202 is shown. The dotted line 202 may represent the straight down position of the locking mechanism 102 shown in association with FIG. 7. The offset distance D is shown from the line 202 to the locking mechanism 102 shown with the curbed/angled arms 104a'-104b'. For example, compared to the example shown in association with FIG. 7, the locking mechanism 102 may be located at a more forward position with respect to the locking pins 120a-120b. For example, if the locking mechanism 102 shown in association with FIG. 7 is located under the bumper of the tow vehicle 52, then the curved/angled arms 104a'-104b' shown in FIG. 9 may locate the locking mechanism 102 in front of the bumper of the tow vehicle 52. Locating the locking mechanism 102 clear of the bumper (or other obstructions) may facilitate access to the keyhole 110 by a user holding the key 200.

Figure 10:
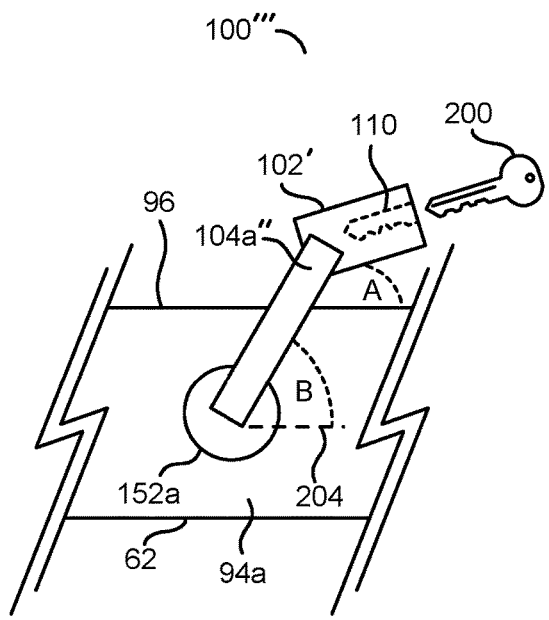
FIG. 10 is a diagram illustrating a side view of the alternate embodiment apparatus with an angled locking mechanism connected to a trailer hitch receiver tube.

Referring to FIG. 10, a diagram illustrating a side view of the alternate embodiment apparatus with an angled locking mechanism connected to a trailer hitch receiver tube is shown. A view of the apparatus 100''' is shown. The view of the apparatus 100''' may be similar to the view of the apparatus 100 shown in association with FIG. 7. One side 94a of the receiver tube 62 is shown. One arm 104a'' is shown wrapping around the side 94a of the receiver tube 62 from above the top side 96 of the receiver tube 62. The other arm 104b'' (not shown) may similarly wrap around on the other side 94b of the receiver tube 62. The locking mechanism 102' is shown above the top side 96 of the receiver tube 62. After clearing the top side 96, the arms 104a''-104b'' are shown extending down at an angle from the locking mechanism 102' towards the locking pins 120a-120b to cover the locking pins 120a-120b. The end 152a of the arm 104a'' may cover the locking pin 120a. The key 200 is shown near the keyhole 110.

The locking mechanism 102' may have the angled orientation with respect to the top side 96 of the receiver tube 62. The locking mechanism 102' may be angled upwards at the angle A (e.g., away) from the top side 96 of the receiver tube 62. In some embodiments of the apparatus 100''', the locking mechanism 102 may be implemented with the keyhole 110 aligned in parallel with the top side 96 of the receiver tube 62. Whether the keyhole 110 is parallel with the top side 96 or at the angle A away from the top side 96 of the receiver tube 62 may be varied according to the design criteria of a particular implementation.

The arms 104a''-104b'' may be angled arms. A dotted line 204 is shown. The dotted line 204 may be a reference line that is in parallel with the top side 96 of the receiver tube 62. An angle B is shown. The angle B may represent the angle of the angled arms 104a''-104b''. For example, the angled arms 104a''-104b'' may be implemented with the angle B at approximately 27.5 degrees to 45 degrees. In some embodiments, the angle B may be the same angle as the angle A. In some embodiments, the angle B may be a different angle than the angle A. The angle B may be larger or smaller than the angle A. The angle implemented for the angle A and/or the angle B may be varied according to the design criteria of a particular implementation.

The angled arms 104a''-104b'' may locate the locking mechanism 102' forward, similar to the example shown with the curved arms 104a'-104b' in association with FIG. 9. The angled arms 104a''-104b'' may offset the locking mechanism 102' a slightly less amount than the offset distance D shown in association with FIG. 9. The angled arms 104a''-104b'' may be angled to connect to the locking mechanism 102a' so that the locking mechanism 102' may be angled upwards. The locking mechanism 102' is shown angled upwards similar to the example shown in FIG. 8 to enable easier access to the keyhole 110 by a user holding the key 200. Implementing the angled arms 104a''-104b'' may provide the offset distance but with a more efficient manufacturing process than the curved arms 104a'-104b'.

In the example embodiments of the apparatus 100-100''' shown, the locking mechanism 102 may be implemented facing a direction in parallel with the receiver tube 62. For example, a person inserting the key 200 may approach the keyhole 110 along the receiver tube 62 and/or the connector 90. In some embodiments, the keyhole 110 of the locking mechanism may be directed out towards one of the sides 94a-94b of the receiver tube 62. For example, the keyhole 110 may face a direction perpendicular to the length of the receiver tube 62 and/or a direction that the connector 90 connects with the receiver tube 62. Facing the keyhole 110 out to the sides 94a-94b of the receiver tube 62 may provide easy access to the keyhole 110 using the key 200 (e.g., free from obstructions such as the ball mount 64, the trailer 68, etc.). The keyhole 110 may be implemented facing either one of the sides 94a-94b. In some embodiments, the keyhole 110 implemented facing out to one of the sides 94a-94b may be implemented above or below the receiver tube 62. With the keyhole 110 facing out to the sides 94a-94b, the locking mechanism 102 may be implemented either straight, at an upwards angle or at a downwards angle. The keyhole 110 facing out to the sides 94a-94b may be implemented with either the straight down arms 104a-104b, the curved arms 104a'-104b' and/or the angled arms 104a''-104b''.

Figure 11:
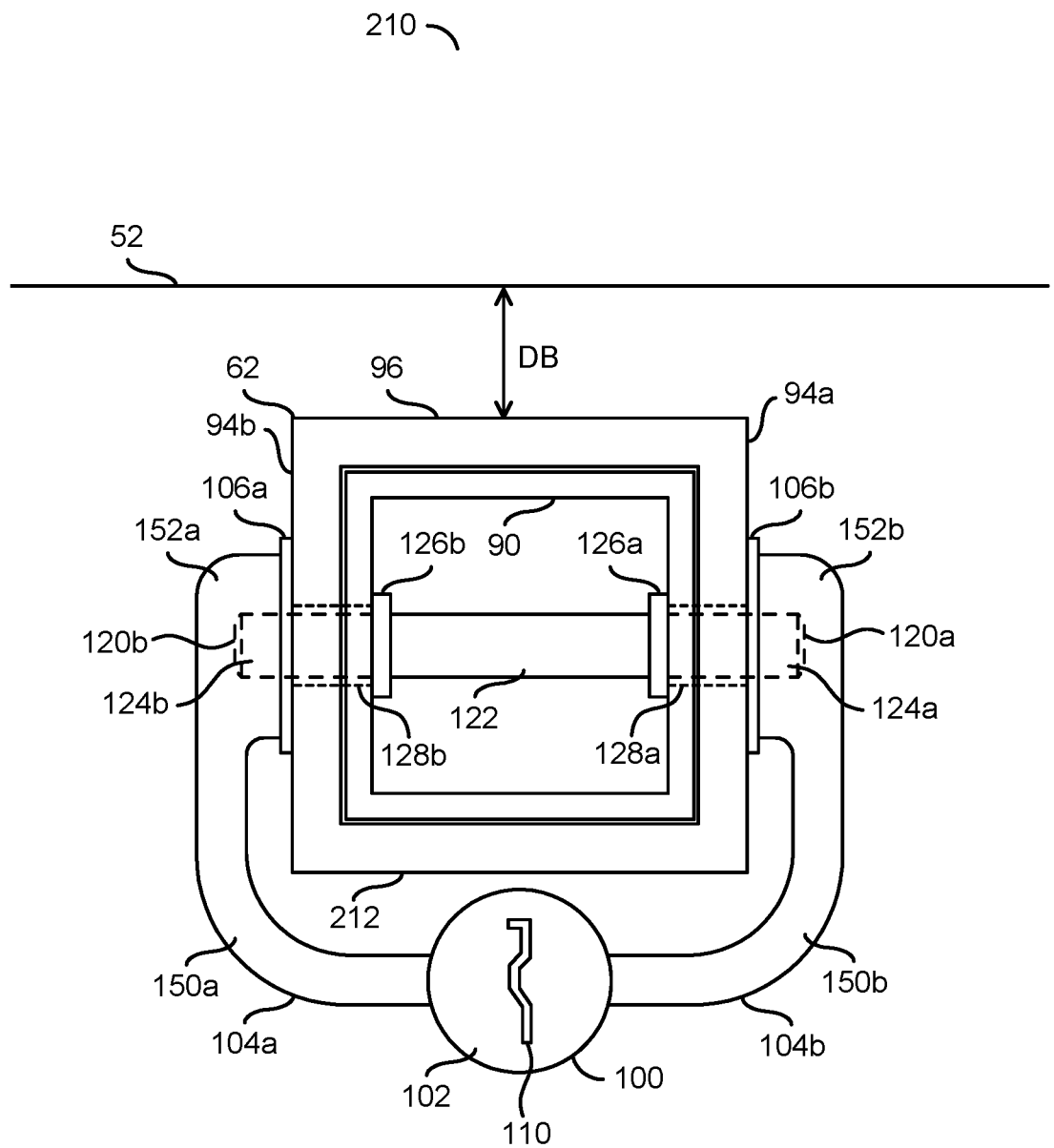
FIG. 11 is a diagram illustrating the apparatus fitting under a receiver tube for a trailer hitch.

Referring to FIG. 11, a diagram illustrating the apparatus fitting under a receiver tube for a trailer hitch is shown. A view 210 is shown. The view 210 may comprise a portion of the tow vehicle 52 (e.g., the bumper), the receiver tube 62, the connector 90 and/or the apparatus 100. Similar to the example shown in association with FIG. 2, the connector 90 is shown within the receiver tube 62. The biasing mechanism 122 is shown within the connector 90. The wide portions 126a-126b of the locking pins 120a-120b are shown being pushed outwards against the inner surface of the connector 90 by the biasing mechanism 122. The narrow portions 124a-124b of the locking pins 120a-120b are shown extending through the openings 128a-128b and protruding from the sides 94a-94b of the receiver tube 62. The top side 96 of the receiver tube 62 is shown below the bumper of the tow vehicle 52.

In some embodiments, the apparatus 100 may be attached to the receiver tube 62 to cover the locking pins 120a-120b in an upward orientation (as shown in association with FIG. 2). In the view 210 the apparatus 100 is shown attached to the receiver tube 62 to cover the locking pins 120a-120b in a downward orientation. The apparatus 100 is shown hanging below the receiver tube 62. For example, the locking mechanism 102 is shown underneath a bottom side 212 of the receiver tube 62.

The apparatus 100 in the downward orientation may have the same implementation as the apparatus 100 in the upward orientation. For example, in the downward orientation, the apparatus 100 may comprise the locking mechanism 102 (with the keyhole 110), the arms 104a-104b (e.g., with the curved portions 150a-150b, the ends 152a-152b and/or the openings 154a-154b) and/or the seals 106a-106b. In the example of the view 210 shown, the apparatus 100 is in the downward orientation. In another example, the apparatus 100', the apparatus 100" and/or the apparatus 100'" may be implemented in the downward orientation.

To implement the apparatus 100 in the downward orientation, the apparatus 100 may be inverted and/or turned over 180 degrees. For example, in the upward orientation, the locking mechanism 102 may be above the top side 96 of the receiver tube 62, and the arms 104a-104b may extend over the top side 96 and partially down the respective sides 94a-94b to enable the openings 154a-154b fit over the respective locking pins 120a-120b. In the downward orientation, the apparatus 100 may cover the opposite sides of the receiver tube 62 and/or the locking pins 120a-120b. For example, in the downward orientation, the locking mechanism 102 may be below the bottom side 212 of the receiver tube 62, and the arms 104a-104b may extend below the bottom side 212. The arm 104a may extend partially up the side 94b to enable the opening 152a to fit over the locking pin 120b. Similarly, the arm 104b may extend partially up the side 94a to enable the opening 152b to fit over the locking pin 120a.

A distance DB is shown. The distance DB may represent a distance between the top side 96 of the receiver tube 62 and the tow vehicle 52. For example, the distance DB may be a distance between the top side 96 of the receiver tube and a bumper of the tow vehicle 52. The distance DB may be a space constraint for placing the apparatus 100. The apparatus 100 may be implemented in the upward orientation if the apparatus 100 does not extend above the top side 96 of the receiver tube 62 a greater distance than the distance DB. Even if the apparatus does not extend above the top side 96 of the receiver tube 62 a distance greater than the distance DB, the amount of space available may be difficult for a user to insert the key 200. In some embodiments, due to space constraints and/or as a preference for the user, the apparatus 100 may be implemented in the downward orientation as shown in the view 210. The bumper of the tow vehicle 52 may be close enough to the receiver tube 62 that the apparatus 100 may not fit in the upward orientation. Flipping the apparatus 100 around 180 degrees may enable the apparatus 100 to connect to the receiver tube 62 even when there is not enough space between the bumper of the tow vehicle 52 and the receiver tube 62. The secure fit of the arms 104a-104b against the sides 94b-94a of the receiver tube 62 and over the locking pins 102b-102a may ensure that the apparatus 100 does not fall down and/or slip off from the receiver tube 62.

Figure 12:
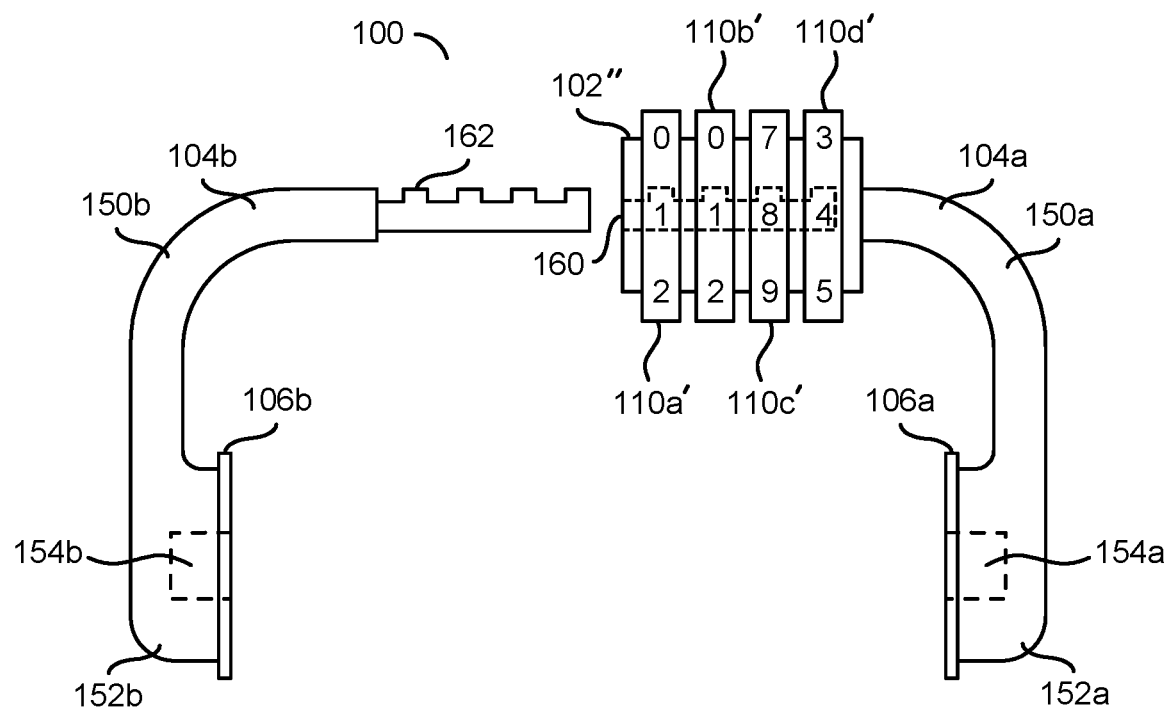
FIG. 12 is a diagram illustrating the apparatus implementing a combination lock.

Referring to FIG. 12, a diagram illustrating the apparatus implementing a combination lock is shown. The apparatus 100 is shown similar to the embodiment shown in association with FIG. 3. For example, the arms 104a-104b, the seals 106a-106b, the curved portions 150a-150b, the ends 152a-152b, the openings 154a-154b, the lock connector 160 and/or the lock connector 162 are shown.

The locking mechanism 102" may be implemented as a combination lock. The combination locking mechanism 102" may comprise a number of combination selectors 110a'-110d'. The combination selectors 110a'-110d' may enable the lock connectors 160-162 to be securely attached and/or disconnected without implementing the keyhole 110 and/or the key 200. The combination selectors 110a'-110d' may be rotated around the combination locking mechanism 102" to enable a user to select a combination of the combination selectors 110a'-110d' in a selection row. In the example shown, the lock connector 162 may comprised ridges configured to match complementary ridges within the lock connector 160. Selecting the correct combination of the combination selectors 110a'-110d' in the selection row may detach the locking connector 160 on the locking mechanism 102'" from the locking connector 162 on the arm 104b. For example, implementing the combination selectors 110a'-110d' may enable the apparatus 100 to be implemented without extra components (e.g., the key 200) that may be lost or forgotten.

While four number selectors 110a'-110d' are shown, the combination locking mechanism 102" may implement any number of number selectors. In the example shown, the combination selectors 110a'-110d' may comprise numerical digits. In another example, the combination selectors 110a'-110d' may comprise letters. In yet another example, the combination selectors 110a'-110d' may comprise shapes, symbols and/or colors. The number, type and/or arrangement of the combination selectors 110a'-110d' may be varied according to the design criteria of a particular implementation.

Figure 13:
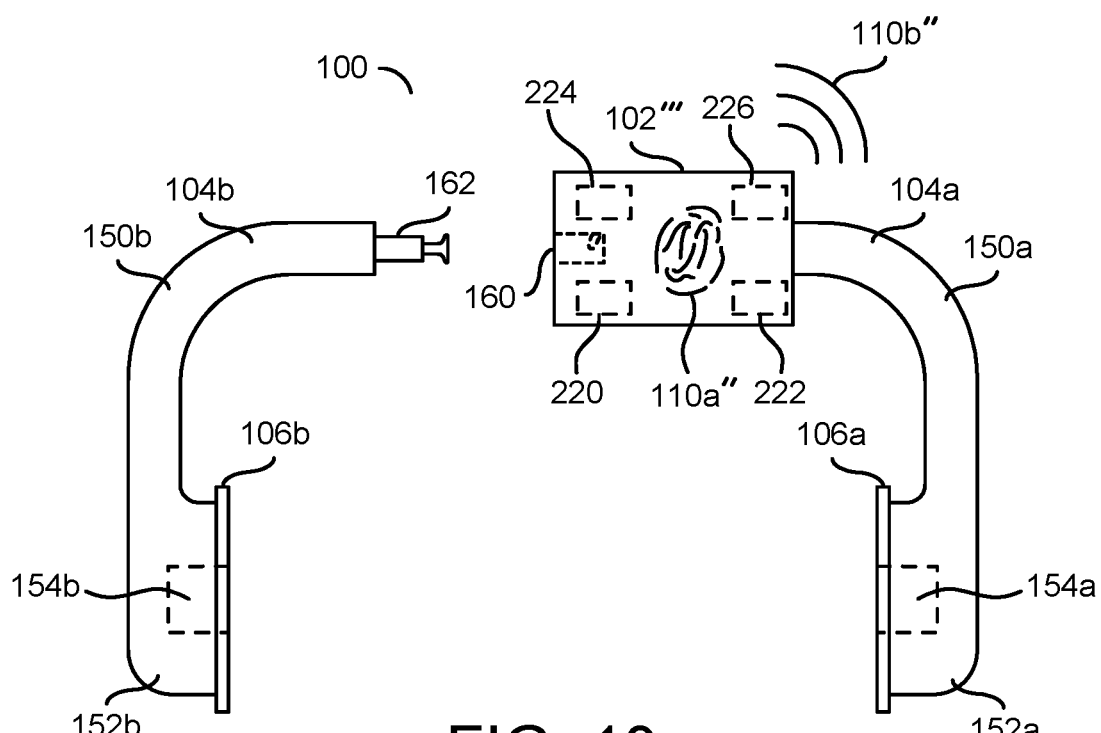
FIG. 13 is a diagram illustrating the apparatus implementing a smart lock.

Referring to FIG. 13, a diagram illustrating the apparatus implementing a smart lock is shown. The apparatus is shown similar to the embodiment shown in association with FIG. 3. For example, the arms 104a-104b, the seals 106a-106b, the curved portions 150a-150b, the ends 152a-152b, the openings 154a-154b, the lock connector 160 and/or the lock connector 162 are shown.

The locking mechanism 102'" may be implemented as a smart lock. The smart locking mechanism 102'" may comprise a fingerprint scanner 110a". For example, a user may program the smart locking mechanism 102'" to read one or more specific fingerprints. The fingerprint scanner 110a" may be configured to read an applied fingerprint from a user and compare the applied fingerprint to one of the pre-programmed fingerprints. If the applied fingerprint matches one of the pre-programmed fingerprints, then the locking connector 160 on the smart locking mechanism 102'" may be released from the locking connector 162 on the arm 104b. If the incorrect fingerprint is scanned, then the arm 104b may remain attached to the smart locking mechanism 102'".

A wireless signal 110b" is shown. In some embodiments, the smart locking mechanism 102'" may implement a Wi-Fi, Bluetooth, ZigBee or other wireless communications protocol. The wireless signal 110b" may be configured to unlock/lock the apparatus 100. For example, the smart locking mechanism 102'" may be locked/unlocked remotely using a smartphone app and/or another type of wireless device (e.g., a proximity device, a smartwatch, a fitness monitoring device, etc.). The wireless signal 110b" may be implemented for the smart locking mechanism 102'" with or without the fingerprint scanner 110a". In some embodiments, the physical key 200 may be implemented as an alternate to the electronic options of the smart locking mechanism 102'" as a failsafe.

The smart locking mechanism 102'" may comprise a block (or circuit) 220, a block (or circuit) 222, a block (or circuit) 224 and/or a block (or circuit) 226. The circuit 220 may implement a power source, the circuit 224 may implement a processor. The circuit 226 may implement a memory. The circuit 226 may implement a communications module. The smart locking mechanism 102''' may comprise other components (not shown). The number, type and/or arrangement of the components of the smart locking mechanism 102''' may be varied according to the design criteria of a particular implementation.

The power source 220 may be configured to provide power to the smart locking mechanism 102'''. In one example, the power source 220 may be a battery. For example, the battery 220 may be configured to supply power to the processor 222, the memory 224, the communication module 226 and/or other electronics of the smart locking mechanism 102'''. In some embodiments, the battery 220 may be replaceable. In some embodiments, the battery 220 may be rechargeable (e.g., the smart locking mechanism 102''' may implement a port, such as a USB-C type port, to enable recharging the Li-Ion battery 220). The type of the power source 220 implemented may be varied according to the design criteria of a particular implementation.

The processor 222 may be configured to execute computer readable instructions. The processor 222 may be configured to manage the various components of the smart locking mechanism 102'''. The processor 222 may be configured to receive input, perform comparisons between received and/or stored input and/or generate output. In an example, the processor 222 may be configured to compare an applied fingerprint read by the fingerprint scanner 110a'' to a stored fingerprint in the memory 224 to determine a match. In another example, the processor 222 may be configured to compare an authentication key received in the wireless signal 110b'' by the communications module 226 and compare the received authentication key with an authentication key stored in the memory 224. The processor 222 may determine whether to unlock the smart locking mechanism 102''' based on the rules set in the computer readable instructions.

The memory 224 may be configured to store the computer readable instructions. The memory 224 may be configured to store one or more pre-approved fingerprints. The memory 224 may be configured to store one or more pre-approved wireless authentication keys. The memory 224 may be configured to present the computer readable instructions, the pre-approved fingerprints and/or the pre-approved wireless authentication keys to the processor 222. The memory 224 may be configured to store other types of authentication details (e.g., a password, a retinal scan, a breathalyzer test, etc.). The type of data stored by the memory 224 may be varied according to the design criteria of a particular implementation.

The communication module 226 may be configured to implement one or more communications protocols. In some embodiments, the communication module 226 may implement a wired communication protocol (e.g., USB). In some embodiments, the communication module 226 may implement a wireless communication protocol (e.g., Wi-Fi, Bluetooth, Zigbee, etc.). The communication module 226 may be configured to send and/or receive the wireless signal 110b''. The communication module 226 may be configured to compare with an app implemented by a smartphone and/or other proximity device. The communication module 226 and/or the processor 222 may be configured to implement a wireless authentication module. For example, the communication module 226 may receive the wireless signal 102b'' and the processor 222 may compare an authentication key in the wireless signal 102b'' to a stored authentication key in the memory 224 to determine whether or not to unlock the smart locking mechanism 102'''. The types of communications protocols implemented by the communication module 226 may be varied according to the design criteria of a particular implementation.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   a first arm comprising a first opening;
   a second arm comprising a second opening; and
   a locking mechanism, wherein
   (a) said first arm is attached to said locking mechanism,
   (b) said second arm is removably attached to said locking mechanism,
   (c) said first arm and said second arm are formed to fit around a receiver tube for a trailer hitch,
   (d) said first opening is configured to fit over a first locking pin that extends through a first side of said receiver tube,
   (e) said second opening is configured to fit over a second locking pin that extends through a second side of said receiver tube, and
   (f) said locking mechanism is configured to secure said first arm and said second arm over said first locking pin and said second locking pin to prevent a connector for a trailer coupler from disconnecting from said receiver tube.

2. The apparatus according to claim 1, wherein said first arm is configured to prevent said first locking pin from being pressed into said receiver tube and said second arm is configured to prevent said second locking pin from being pressed into said receiver tube.

3. The apparatus according to claim 1, further comprising a first seal around said first opening and a second seal around said second opening.

4. The apparatus according to claim 1, wherein said locking mechanism is located above said receiver tube when said connector for said trailer coupler is connected to said receiver tube, said first locking pin is within said first opening and said second locking pin is within said second opening.

5. The apparatus according to claim 1, wherein said locking mechanism is located below said receiver tube when said connector for said trailer coupler is connected to said receiver tube, said first locking pin is within said first opening and said second locking pin is within said second opening.

6. The apparatus according to claim 1, wherein a face of said locking mechanism is parallel to said receiver tube when said apparatus is connected to said receiver tube.

7. The apparatus according to claim 1, wherein a face of said locking mechanism is at an angle with respect to said receiver tube when said apparatus is connected to said receiver tube.

8. The apparatus according to claim 7, wherein said angle is approximately 27.5 degrees away from said receiver tube.

9. The apparatus according to claim 1, wherein (i) said first arm comprises said first opening at a first end and a locking connector at a second end and (ii) said locking connector is configured to enable a lock fit with said locking mechanism.

10. The apparatus according to claim 9, wherein said locking mechanism comprises a keyhole configured to enable a key to secure said lock fit.

11. The apparatus according to claim 9, wherein said locking mechanism comprises a combination lock configured to enable said lock fit.

12. The apparatus according to claim 9, wherein said locking mechanism comprises a fingerprint scanner configured to enable said lock fit.

13. The apparatus according to claim 9, wherein said locking mechanism comprises a wireless authentication module configured to enable said lock fit.

14. The apparatus according to claim 1, wherein (i) said first arm and said second arm extend down from said locking mechanism to cover said first locking pin and said second locking pin and (ii) said locking mechanism is located straight above and in between said first locking pin and said second locking pin.

15. The apparatus according to claim 1, wherein (i) said first arm and said second arm extend down at an angle from said locking mechanism to cover said first locking pin and said second locking pin and (ii) said locking mechanism is located above and offset a distance from said first locking pin and said second locking pin.

16. The apparatus according to claim 1, wherein said locking mechanism is located below a bumper of a tow vehicle when said apparatus is connected to said receiver tube.

17. The apparatus according to claim 1, wherein said locking mechanism comprising a keyhole that is directed outward from said first side of said receiver tube.

18. The apparatus according to claim 1, wherein said first arm and said second arm are configured to provide a compression fit against said first side of said receiver tube and said second side of said receiver tube to prevent said apparatus from rotating when attached to said receiver tube.

19. The apparatus according to claim 1, wherein securing said first arm and said second arm over said first locking pin and said second locking pin prevents said apparatus from being pulled away from said first locking pin and said second locking pin without first unlocking said locking mechanism.

* * * * *